INVENTOR.
NILS HOGLUND

Aug. 30, 1966 N. HOGLUND 3,269,257
APPARATUS FOR CHECKING CAMS
Filed Oct. 24, 1963 6 Sheets-Sheet 5

INVENTOR.
NILS HOGLUND
BY
William A. Zalesak
Attorney

Aug. 30, 1966 N. HOGLUND 3,269,257
APPARATUS FOR CHECKING CAMS
Filed Oct. 24, 1963 6 Sheets-Sheet 6

INVENTOR.
NILS HOGLUND
BY William A. Zalesak
Attorney

United States Patent Office 3,269,257
Patented August 30, 1966

3,269,257
APPARATUS FOR CHECKING CAMS
Nils Hoglund, 296 Hartshorn Drive, Short Hills, N.J.
Filed Oct. 24, 1963, Ser. No. 318,542
11 Claims. (Cl. 88—24)

My invention relates to apparatus for checking the accuracy of cams, particularly cams used in contour wheel dressers but not limited thereto. More particularly, my invention relates to such apparatus which eliminates the necessity of placing the cams on and accurately positioning the cams on the apparatus with which the cams are to be used in order to check the accuracy of the cams.

In prior practice cams were designed and formed from accurately designed drawings and made from such drawings. However, there was no practical way available to check the accuracy of such cams without placing the cams on the apparatus for which they were designed, actually forming a contour with the apparatus and then checking the accuracy of the contour on a work piece which was formed by the apparatus for forming the contour. Such a procedure requires a great deal of time, wastes material and thus is very costly.

In some forms of apparatus more than one cam is used in combination with others to control the movement for example of a forming tool. Such apparatus can take the form of wheel dressers, milling machines and like apparatus. In these cases each cam must be minutely checked. This, however, becomes a difficult task if the contours of more than one cam needs to be checked since error in any of the cams can cause inaccuracies in the movement of the forming tool. This problem becomes particularly serious when more than one cam must be checked and where the accuracies must be within thousandths of an inch, that is a mil or less. Some of these apparatus move the tool in three dimensions. This form of apparatus places particularly severe conditions on occuracy.

It is therefore an object of my invention to provide a novel apparatus for checking the accuracy of cams controlling the movement of tools for forming contours on work pieces. Particularly, it is an object of my invention to provide a novel apparatus for checking one or more cams simultaneously without the necessity of placing the cams on the apparatus which utilizes such cams in its forming operations.

Briefly, apparatus made according to my invention includes a slide, or slides which carry the cam or cams to be checked. A further slide or slides carries a simulated tool or copy of the forming tool. The simulated tool may take the form of a blank having a small aperture therethrough which aperture is located in the blank at a position corresponding to the position of the cutting point or forming point of the cutting tool. The slide carrying the simulated tool is positioned to pass the simulated tool or facsimile between a light source and a comparator screen. The comparator screen is provided with a transparent chart having thereon the path enlarged, of the tool which is to be controlled by the cams being checked. As the apparatus controlled by the cams causes the simulated tool to move through the desired forming path, its shadow falls on the chart. In the case of the apertured blank, the shadow cast on the screen provides a light spot which follows or moves along the desired forming path. Even any small deviation from the required path can be detected. Thus, it is possible to quickly and easily detect a defective cam.

Referring to the drawings.

Figure 1:
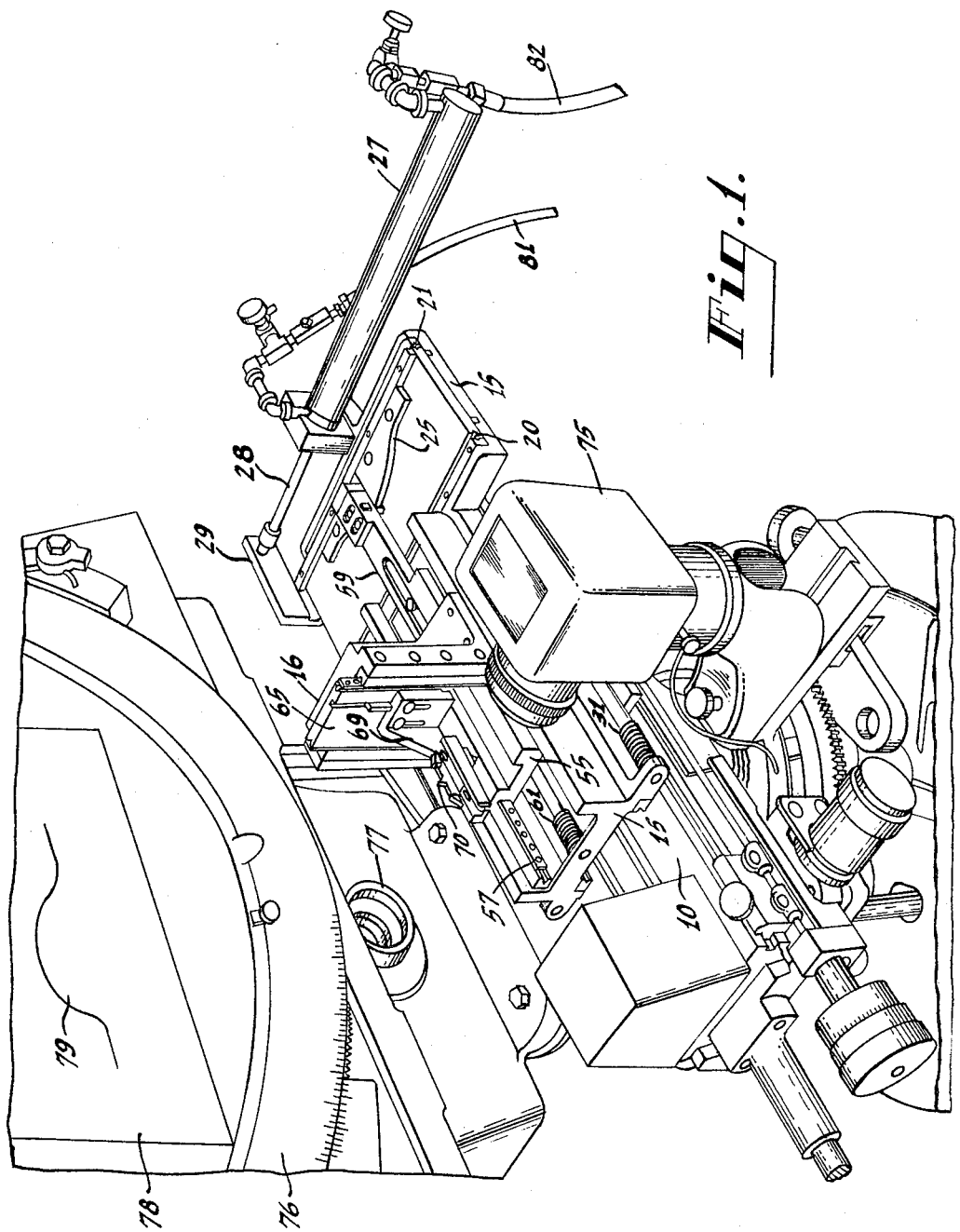
FIG. 1 is a perspective of apparatus utilizing my invention.

Referring to FIGS. 1, 2, 5 and 6, apparatus made according to my invention includes a base 10 having a slide guide 11 supported thereon. This arrangement can be located and fixed on the comparator by locking key 12 controlled by screw 13.

The main housing which carries the slides and cams is slidably mounted on the slide guide 11. The main housing includes a lower portion 15 and a top portion 16 extending normally from the portion 15. The lower portion 15 carries two slides movable transversely of each other. One of these slides carries a feed cam and a contour cam. A second slide carries a follower in contact with the contour cam and a ratio cam. The normally extending portion of the housing carries a slide supporting the simulated diamond (the forming tool). This last slide also carries a follower which controls the movement of the simulated tool supporting slide. The housing 15, 16 is supported on slide guide 11 by means of ball bearing assemblies 17 and 18.

Figure 2:
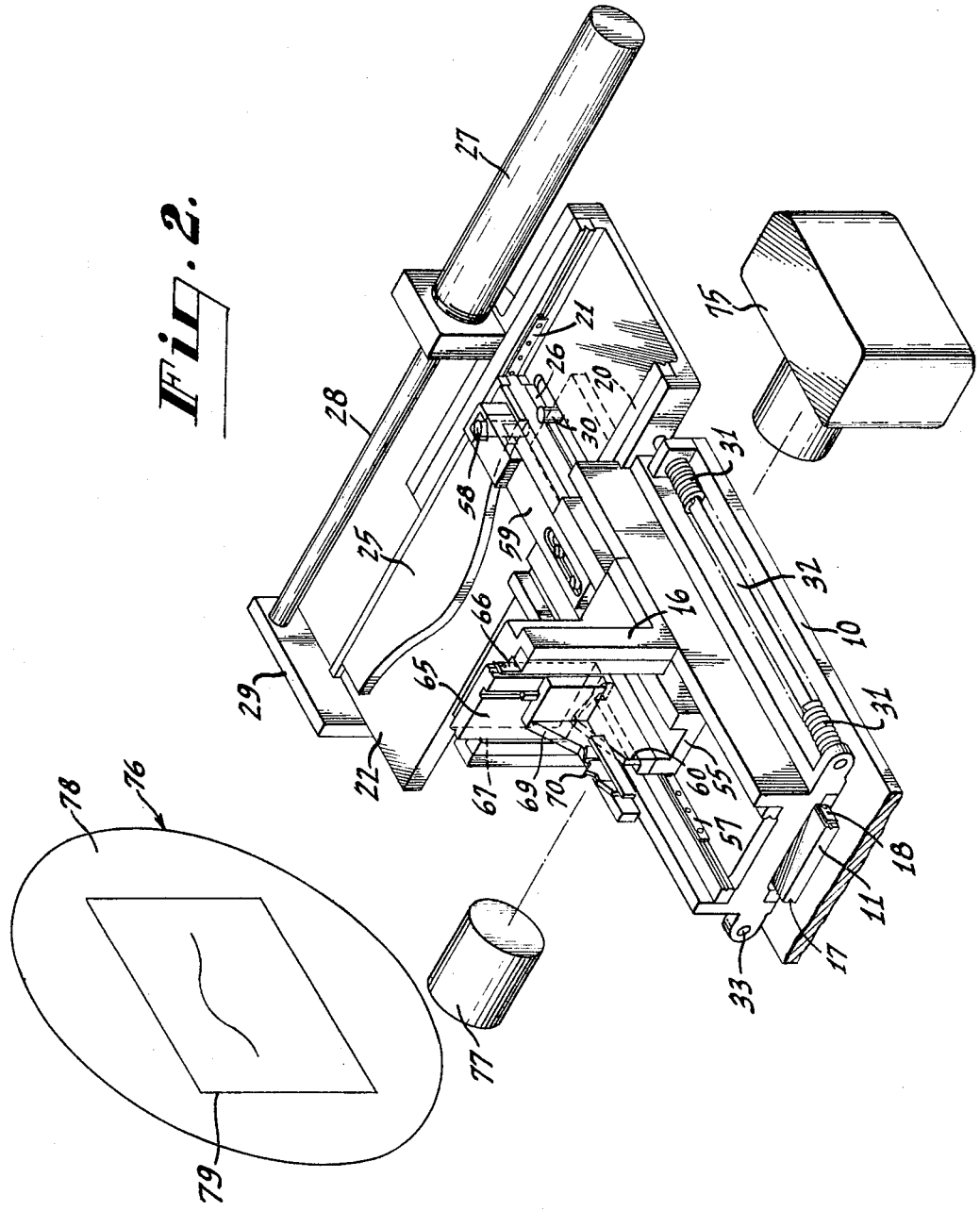
FIG. 2 is a partially schematic and perspective view, with parts removed, of the elements utilized in the apparatus shown in FIG. 1.
Figure 6:
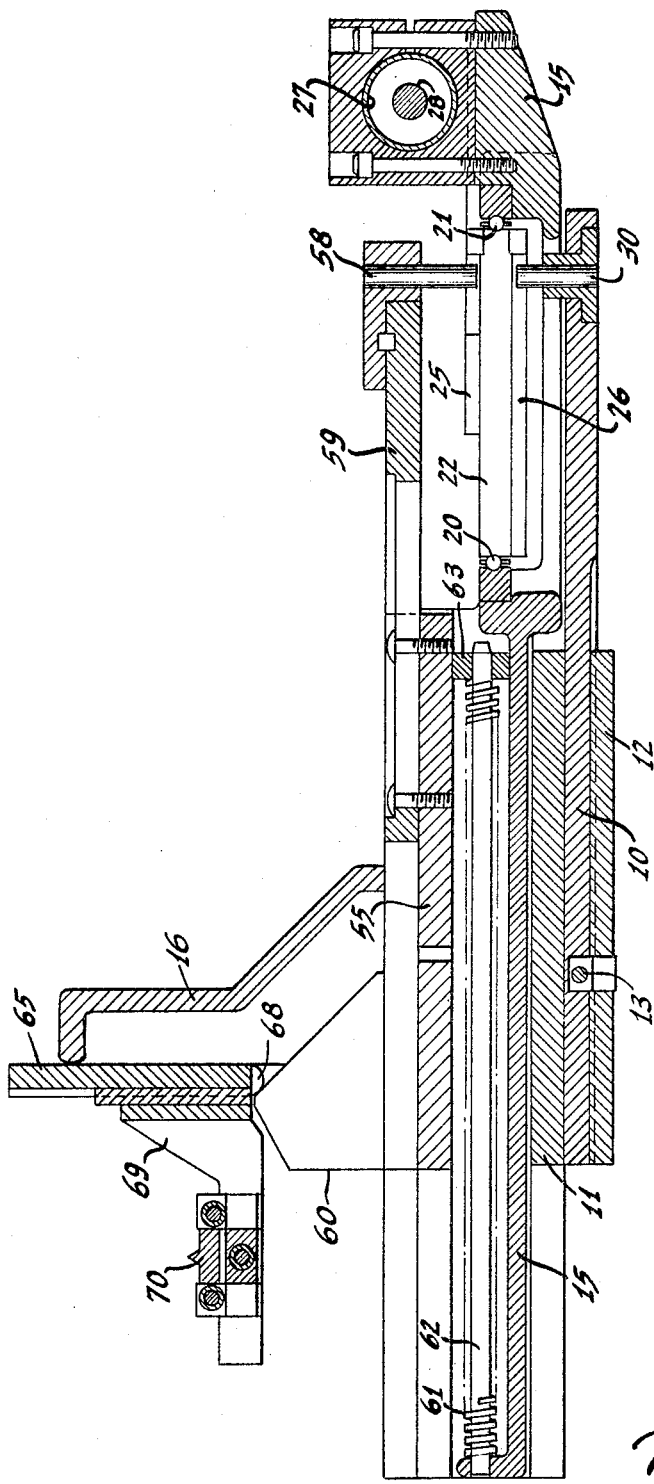
FIG. 6 is a vertical section taken along the line 6—6 of FIG. 3.

Again referring particularly to FIGS. 1, 2, and 6, the lower housing portion 15, has slidably supported therein by ball bearing assemblies 20 and 21, a slide 22. Fixed to the slide 22 on the upper side is the contour cam 25 and on the lower side the feed cam 26, each of which cams can be changed to provide different profiles and ratio relationships. The slide 22 is controlled by the fluid operated piston 27 mounted on housing 15 and connected to the slide 22 by means of the piston rod 28 which is connected to slide 22 by block 29. The base 10 has fixed thereto a stationary follower 30 which contacts the feed cam 26. As will be described below, as the piston 27 is energized, the slide 22 is moved back and forth to control movement of the slide 22 which in turn controls movement of the simulated tool (diamond).

Figure 3:
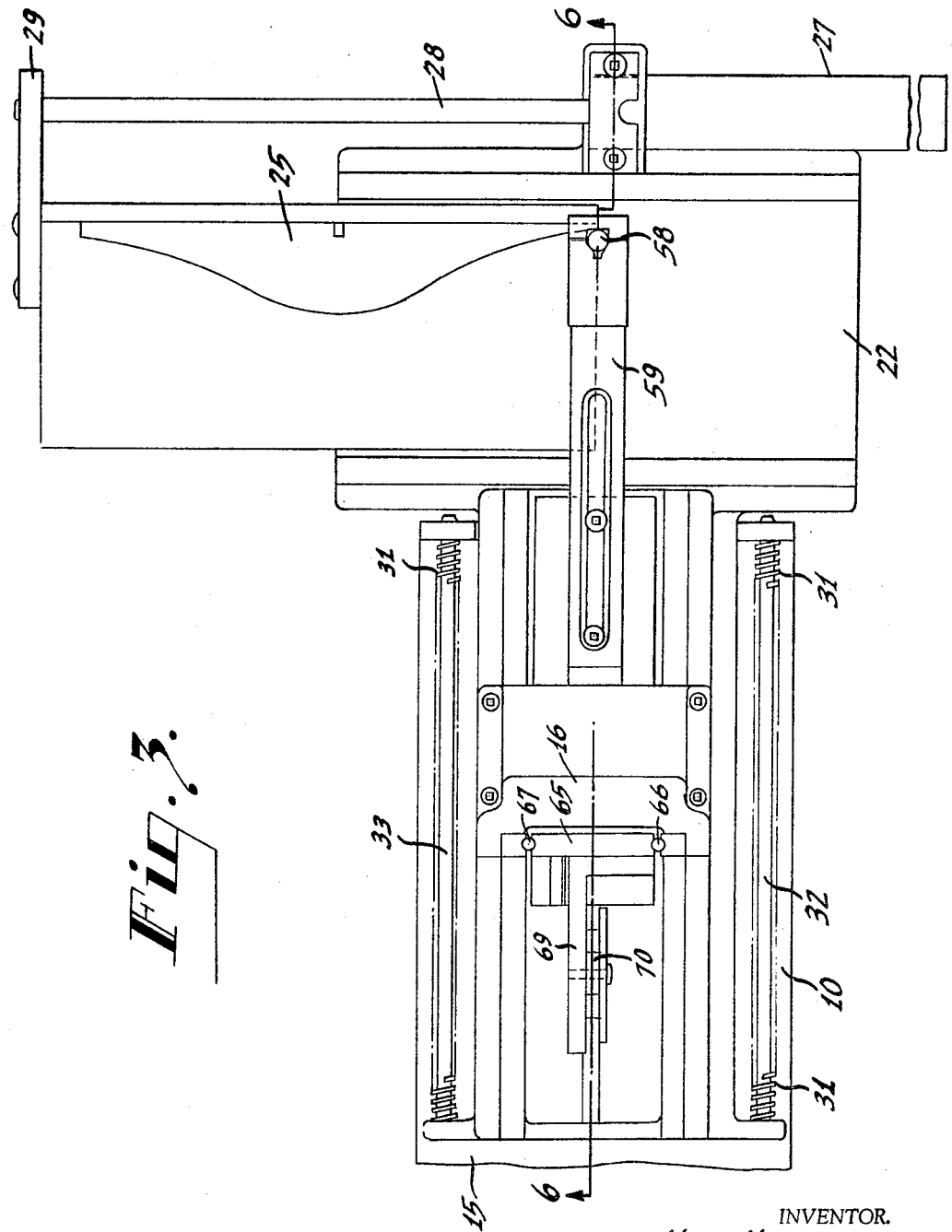
FIG. 3 is a plan view, with parts removed of the apparatus shown in FIGS. 1 and 2.
Figure 4:
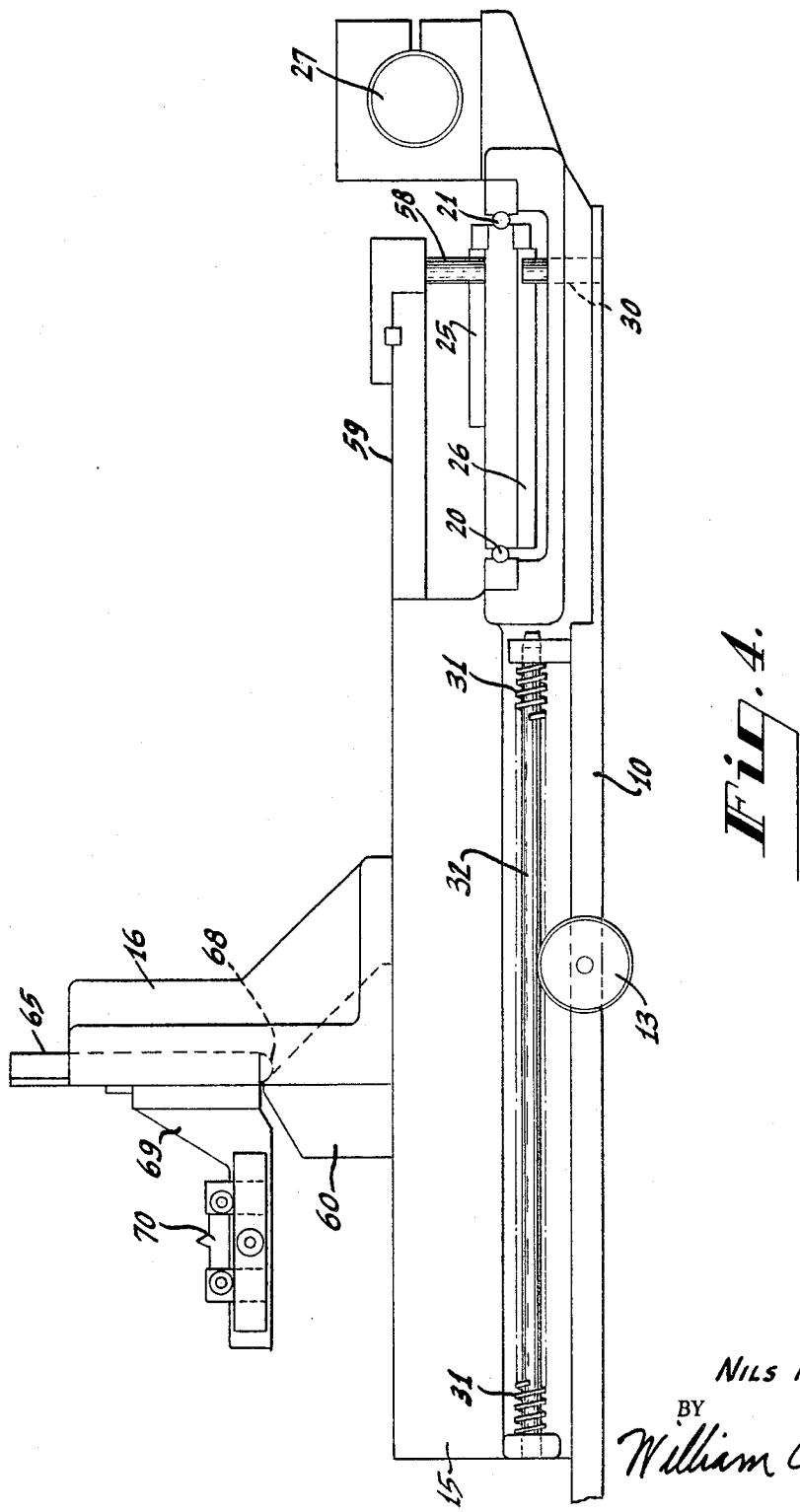
FIG. 4 is a side elevation of FIG. 3.
Figure 5:
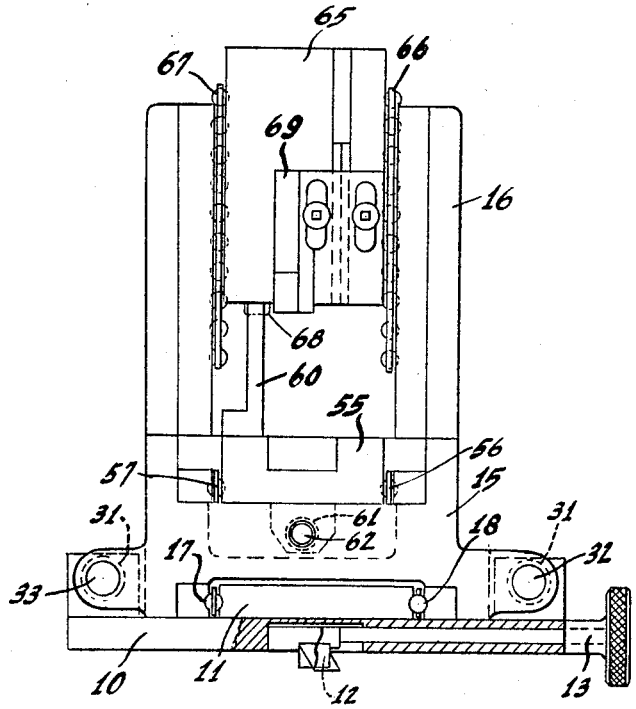
FIG. 5 is a left end view, partially in section of FIG. 4.

To insure contact of the feed cam 26 against follower 30, I provide biasing springs 31, 31 mounted on spring guides 32 and 33. These biasing springs urge the housing to the left as shown in FIGS. 1, 2 and 3.

To transmit movement from the contour cam 25 to the simulated tool, I provide a second slide 55 in the housing 15 and slidably support it by means of ball bearing assemblies 56 and 57. Adjustably fixed to one end of slide 55 is a follower 58 adjustably mounted by means of follower adjustment block 59 fixed to slide 55. Follower 58 contacts contour cam 25. At the other end of slide 55 is the ratio cam 60 which controls the vertical movement of the simulated tool slide. To insure contact between follower 58 and the contour cam, I provide the biasing spring 61 (under compression) mounted on spring guide 62, the spring being compressed between the end wall of the lower housing 15 and a bracket 63 on slide 55.

The simulated tool slide 65 is slidably mounted for vertical movement in the housing portion 16 by means of ball bearing assemblies 66 and 67. There is secured to the lower end of slide 65 the follower 68 which contacts the ratio cam 60. Adjustably attached to slide 65 is the simulated tool holder 69 carrying the simulated tool 70.

As best shown in FIGS. 1 and 2, the simulated tool 70 is positioned between a light beam housing 75 and a comparator 76, provided with the lens arrangement 77 which picks up the shadow of the simulated tool 70 and projects it by reflection onto the screen 78 which has attached thereto a transparent reproduction 79 on an enlarged scale and accurately drawn the contour of the cam 25. The simulated tool may take the form of a blank having an aperture through which light is projected. In this case a light spot is used instead of a shadow for following the contour shown on the screen.

In order to check cam 25 for accuracy, it is secured to slide 22, having selected the proper feed and ratio cams 26 and 60. The piston 27 connected to a pressure source (not shown) by conduits 81 and 82 is actuated to move the slide 22 back and forth toward and from the comparator. The follower 30 contacting the feed cam 26 causes the housing 15 to move from left to right and the reverse against the action of the biasing springs 31 which are under compression.

At the same time, the follower 58, which is mounted in contact with contour cam 25 by means of biasing spring 61, causes slide 55 to move back and forth in accordance with the contour on cam 25. This movement is transferred to simulated tool slide 65 through the ratio cam 60 and follower 68, the weight of slide 65 and holder or bracket 69 biasing the follower 68 against cam 60. This causes the simulated tool 70 to pass across the light beam from the light housing 75 and cast a shadow on the tracing 79. Any variations in the contour of contour cam 25 from desired tolerances is easily detected if the shadow of the cutting point of the simulated tool fails to follow the pattern on the tracing 79. Simultaneously the contour on the feed cam is also checked.

What is claimed is:

1. Apparatus for checking the accuracy of contours on cams adapted to control the movement of forming tools including a base member, a comparator on one side of said base member and a light source on the other side of said base member, a first slide on said base member movable transversely of said light source and said comparator, a second slide on said first slide and movable parallel to said first slide, a simulated tool slide on said first slide and movable transversely of said first and second slides and carrying an element for tracing a path on said comparator, a third slide on said first slide and movable transversely of said first slide, a cam to be checked supported on said third slide, said second slide having cam and follower means for connecting said cam to be checked and said simulated tool slide for causing movement of said element between said light source and said comparator whereby said element traces a path on said comparator determined by said cam to be checked and means for moving said first slide responsive to movement of said third slide.

2. Apparatus for checking the accuracy of contours on cams adapted to control the movement of forming tools including a base member, a comparator on one side of said base member and a light source on the other side of said base member, a first slide on said base member movable transversely of said light source and said comparator, a second slide on said first slide and movable parallel to said first slide, a simulated tool slide on said first slide and movable transversely of said first and second slides and carrying an apertured element for tracing a path on said comparator, a third slide on said first slide and movable transversely of said first slide, a cam to be checked supported on said third slide, said second slide having cam and follower means for connecting said cam to be checked and said simulated tool slide for causing movement of said element between said light source and said comparator whereby a light spot traces a path on said comparator determined by said cam to be checked and means for moving said first slide responsive to movement of said third slide.

3. Apparatus for checking the accuracy of contours on cams adapted to control the movement of forming tools including, a base member, a comparator on one side of said base member and a light source on the other side of said base member, a first slide on said base member movable transversely of said light source and said comparator, a second slide on said first slide and movable parallel to said first slide, a simulated tool slide on said first slide and movable transversely of said first and second slides and carrying an apertured element for tracing a path on said comparator, a third slide on said first slide and movable transversely of said first slide, a cam to be checked supported on said third slide, said second slide having cam and follower means for connecting said cam to be checked and said simulated tool slide for causing movement of said element between said light source and said comparator whereby a light spot traces a path on said comparator determined by said cam to be checked and means for moving said first slide responsive to movement of said third slide.

4. Apparatus for checking the accuracy of contours on cams adapted to control the movement of forming tools including a base member, a comparator on one side of said base member and a light source on the other side of said base member, a first slide on said base member movable transversely of said light source and said comparator, a simulated tool slide on said first slide and movable transversely of said first slide and carrying a simulated tool, a third slide on said first slide and movable transversely of said first slide, a cam to be checked supported on said third slide, said second slide having cam and follower means for connecting said cam to be checked and said simulated tool slide for causing movement of said simulated tool between said light source and said comparator whereby the shadow cast by said simulated tool traces a path on said comparator determined by said cam and means for moving said first slide responsive to movement of said third slide.

5. Apparatus for checking the accuracy of contours on cams adapted to control the movement of forming tools including (1) a base member, (2) a comparator on one side of said base member and a (3) light source on the other side of said base member, a first slide on said base member movable transversely of said light source and said comparator, a second slide on said first slide and movable parallel to said first slide, a simulated tool slide on said first slide and movable transversely of said first and second slides and carrying a simulated tool, a third slide on said first slide and movable transversely of said first slide, a contour cam and a feed cam supported on said third slide, a follower fixed to said base and contacting said feed cam, said second slide having a ratio cam at one end in contact with said simulated tool slide and a follower connecting said contour cam for causing movement of said simulated tool between said light source and said comparator whereby the shadow cast by said simulated tool traces a path on said comparator determined by said cams.

6. Apparatus for checking the accuracy of contours on cams adapted to control the movement of forming tools including (1) a base member, (2) a comparator on one side of said base member and a (3) light source on the other side of said base member, a first slide on said base member movable transversely of said light source and said comparator, a second slide on said first slide and movable parallel to said first slide, a simulated tool slide on said first slide and movable transversely of said first and second slides and carrying a simulated tool, a third slide on said first slide and movable transversely of said first slide, a contour cam and a feed cam supported on said third slide, a follower fixed to said base and contacting said feed cam, said second slide having a ratio cam at one end in contact with said simulated tool slide and a follower connecting said contour cam for causing movement of said simulated tool between said light source and said comparator whereby the shadow cast by said simulated tool traces a path on said comparator determined by said cams, and means on said comparator having a path traced thereon on which said shadow is superimposed for detecting any variations in contour on said cams.

7. Apparatus for checking the accuracy of contours on cams including (a) a base member, (b) a comparator on one side of said base member and a (c) light source on the other side of said base member, a first slide on said base member movable transversely of said light source and said comparator, a simulated tool slide on said first slide and movable transversely of said first slide and carrying a simulated tool, a second slide on said first slide and movable transversely of said first slide, a cam to be checked supported on said second slide, said first slide having cam and follower means for connecting said cam to be checked and said simulated tool slide for causing movement of said simulated tool between said light source and said comparator whereby the shadow cast by said simulated tool traces a path on said comparator determined by said cam.

8. Apparatus for checking the accuracy of contours on cams including (1) a base member, (2) a comparator on one side of said base member and a (3) light source on the other side of said base member, a slide housing on said base member movable transversely of said light source and said comparator, a first slide on said slide housing and movable parallel to said slide housing a simulated tool slide on said slide housing and movable transversely of said slide housing and said first slide and carrying a simulated tool, a second slide on said slide housing and movable transversely of said slide housing, a feed cam and a contour cam carried on opposite sides of said second slide, a follower in contact with said feed cam and fixed to said base, said first slide and said simulated tool slide being connected by cam and follower means for causing movement of said simulated tool between said light source and said comparator whereby the shadow cast by said simulated tool traces a path on said comparator determined by said cams.

9. Apparatus for checking the accuracy of cams adapted to control the movement of a forming tool including a base member, a comparator on one side of said base member and a light source on the other side of said base member for directing light across said base member to said comparator, a slidable housing mounted on said base member for movement transversely of said comparator and said light source, a first slide on said slidable housing having a simulated forming tool thereon and movable between said light source and said comparator, a second slide on said housing carrying a cam to be checked, a third slide carrying a follower at one end and a ratio cam at the other end and connected between said cam to be check and said first slide, and means for moving said housing responsive to movement of said third slide.

10. Apparatus for checking the accuracy of cams adapted to control the movement of a forming tool including a base member, a comparator on one side of said base member and a light source on the other side of said base member for directing light across said base member to said comparator, a slidable housing mounted on said base member for movement transversely of said comparator and said light source, a first slide on said slidable housing having a simulated forming tool thereon and movable between said light source and said comparator, a second slide carrying a cam to be checked, a third slide carrying a follower at one end and a ratio cam at the other end and connected between said cam to be checked and said first slide, said second slide carrying a feed cam and a fixed follower on said base member in contact with said feed cam for controlling movement of said slidable housing.

11. Apparatus for checking the accuracy of contours on cams adapted to control the movement of forming tools including a base member, a comparator on one side of said base member and a light source on the other side of said base member, a first slide on said base member movable transversely of said light source and said comparator, a second slide on said first slide and movable parallel to said first slide, a simulated tool slide on said first slide and movable transversely of said first and second slides and carrying an element for tracing a path on said comparator, a third slide on said first slide and movable transversely of said first slide, a cam to be checked supported on said third slide, said second slide having cam and follower means for connecting said cam to be checked and said simulated tool slide for causing movement of said element between said light source and said comparator whereby said element traces a path on said comparator determined by said cam to be checked, said third slide carrying a feed cam and a fixed follower on said base member in contact with said feed cams for controlling movement of said first slide.

References Cited by the Examiner

UNITED STATES PATENTS

| | | | |
|---|---|---|---|
| 2,451,155 | 10/1948 | DeBoer et al. | 88—24 |
| 2,476,312 | 7/1949 | Luety | 88—24 |
| 2,930,283 | 3/1960 | Smith et al. | 88—24 |
| 3,077,815 | 2/1963 | Coakley | 88—24 |

NORTON ANSHER, *Primary Examiner.*

HAROLD H. FLANDERS, *Assistant Examiner.*